(12) United States Patent
Bhushan et al.

(10) Patent No.: US 8,559,879 B2
(45) Date of Patent: Oct. 15, 2013

(54) NULL PILOTS FOR INTERFERENCE ESTIMATION IN A WIRELESS COMMUNICATION NETWORK

(75) Inventors: Naga Bhushan, San Diego, CA (US); Alexei Y. Gorokhov, San Diego, CA (US); Mohammad J. Borran, San Diego, CA (US); Avneesh Agrawal, San Diego, CA (US); Aamod D. Khandekar, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 611 days.

(21) Appl. No.: 12/425,243

(22) Filed: Apr. 16, 2009

(65) Prior Publication Data

US 2010/0099428 A1    Apr. 22, 2010

Related U.S. Application Data

(60) Provisional application No. 61/047,063, filed on Apr. 22, 2008, provisional application No. 61/108,429, filed on Oct. 24, 2008.

(51) Int. Cl.
*H04B 1/00* (2006.01)
(52) U.S. Cl.
USPC ................ 455/63.1; 455/452.1; 455/522
(58) Field of Classification Search
USPC ............... 455/63.1, 452.1, 522, 452, 1
See application file for complete search history.

(56) References Cited

U.S. PATENT DOCUMENTS

| | | | |
|---|---|---|---|
| 5,530,917 A | 6/1996 | Andersson et al. |
| 5,848,357 A | 12/1998 | Dehner et al. |
| 5,978,657 A | 11/1999 | Suzuki |
| 6,031,827 A | 2/2000 | Rikkinen et al. |

(Continued)

FOREIGN PATENT DOCUMENTS

| | | | |
|---|---|---|---|
| CN | 101001097 A | 7/2007 |
| EP | 0650649 A1 | 5/1995 |

(Continued)

OTHER PUBLICATIONS

International Search Report and Written Report—PCT/US2009/041456, International Search Authority—European Patent Office—Aug. 25, 2009.

(Continued)

*Primary Examiner* — Patricia Nguyen
(74) *Attorney, Agent, or Firm* — Florin Corie

(57) ABSTRACT

Techniques for transmitting null pilots to support interference estimation in a wireless network are described. A null pilot is non-transmission on designated time-frequency resources by a cell or a cluster of cells supporting cooperative transmission to a UE. The received power of the null pilot from the cell or cluster of cells may be indicative of interference from other cells. In one design, a cell in the cluster may determine resources for sending a null pilot by the cell. The cell may transmit the null pilot (i.e., send no transmissions) on the resources to allow UEs to estimate out-of-cluster interference. Some or all cells in the cluster may transmit null pilots on the same resources. The cell may receive interference and channel information from the UE and may send data transmission to the UE based on the interference and/or channel information. Remaining cells in the cluster may reduce interference to the UE.

49 Claims, 7 Drawing Sheets

(56) References Cited

U.S. PATENT DOCUMENTS

| | | | |
|---|---|---|---|
| 6,490,262 B1 | 12/2002 | Hogger | |
| 6,611,231 B2 | 8/2003 | Crilly et al. | |
| 6,618,365 B1 | 9/2003 | Vannatta et al. | |
| 7,069,033 B1 | 6/2006 | Moon et al. | |
| 7,085,581 B2 | 8/2006 | Vanghi | |
| 7,184,743 B2* | 2/2007 | Walton et al. | 455/343.4 |
| 7,218,948 B2 | 5/2007 | Laroia et al. | |
| 7,292,552 B2 | 11/2007 | Willenegger et al. | |
| 7,373,162 B2 | 5/2008 | Farnham et al. | |
| 7,453,854 B2* | 11/2008 | Fujishima et al. | 370/335 |
| 7,499,437 B2 | 3/2009 | Das et al. | |
| 7,653,386 B2 | 1/2010 | Bennett | |
| 7,664,522 B2 | 2/2010 | Stolle et al. | |
| 7,720,038 B2 | 5/2010 | Bennett | |
| 7,751,843 B2 | 7/2010 | Butala | |
| 7,778,309 B2* | 8/2010 | Jung et al. | 375/148 |
| 7,813,700 B2* | 10/2010 | Zheng et al. | 455/63.1 |
| 7,830,845 B2 | 11/2010 | Bennett | |
| 7,864,742 B2 | 1/2011 | Bennett | |
| 7,890,061 B2 | 2/2011 | Kasher et al. | |
| 7,940,740 B2 | 5/2011 | Krishnamurthy et al. | |
| 7,965,789 B2 | 6/2011 | Khandekar et al. | |
| 8,059,611 B2 | 11/2011 | Ishii et al. | |
| 8,112,074 B2 | 2/2012 | Bennett | |
| 8,165,586 B2 | 4/2012 | Krishnamurthy et al. | |
| 8,170,546 B2 | 5/2012 | Bennett | |
| 8,265,562 B2 | 9/2012 | Gorokhov et al. | |
| 8,320,352 B2 | 11/2012 | Sampath | |
| 8,320,354 B2 | 11/2012 | Sampath | |
| 8,411,805 B1* | 4/2013 | Lee et al. | 375/341 |
| 2003/0109217 A1 | 6/2003 | Reed et al. | |
| 2004/0166887 A1 | 8/2004 | Laroia et al. | |
| 2005/0007994 A1 | 1/2005 | Fukuzawa et al. | |
| 2005/0122999 A1 | 6/2005 | Scherzer et al. | |
| 2005/0136841 A1 | 6/2005 | Frank | |
| 2005/0163164 A1 | 7/2005 | Cramer et al. | |
| 2005/0163194 A1 | 7/2005 | Gore et al. | |
| 2005/0254555 A1 | 11/2005 | Teague | |
| 2006/0209721 A1 | 9/2006 | Mese et al. | |
| 2007/0097928 A1 | 5/2007 | Anderson | |
| 2007/0101020 A1 | 5/2007 | Lin et al. | |
| 2007/0105574 A1 | 5/2007 | Gupta et al. | |
| 2007/0140168 A1 | 6/2007 | Laroia et al. | |
| 2008/0057934 A1 | 3/2008 | Sung et al. | |
| 2008/0069062 A1 | 3/2008 | Li et al. | |
| 2008/0076408 A1 | 3/2008 | Katayama et al. | |
| 2008/0205361 A1 | 8/2008 | Takeuchi et al. | |
| 2009/0010238 A1* | 1/2009 | Barak et al. | 370/342 |
| 2009/0022173 A1 | 1/2009 | Horn et al. | |
| 2009/0122782 A1 | 5/2009 | Horn et al. | |
| 2009/0168800 A1 | 7/2009 | Leinonen et al. | |
| 2009/0175324 A1 | 7/2009 | Sampath et al. | |
| 2009/0197538 A1 | 8/2009 | Borran et al. | |
| 2009/0197588 A1 | 8/2009 | Khandekar et al. | |
| 2009/0197590 A1 | 8/2009 | Borran et al. | |
| 2009/0197629 A1 | 8/2009 | Borran et al. | |
| 2009/0197631 A1 | 8/2009 | Palanki et al. | |
| 2009/0225885 A1* | 9/2009 | Aoki et al. | 375/260 |
| 2009/0227263 A1 | 9/2009 | Agrawal et al. | |
| 2009/0228598 A1 | 9/2009 | Stamoulis et al. | |
| 2010/0099449 A1 | 4/2010 | Borran et al. | |
| 2010/0260133 A1 | 10/2010 | Sampath et al. | |
| 2011/0105065 A1 | 5/2011 | Sampath et al. | |
| 2011/0207410 A1 | 8/2011 | Gupta | |
| 2011/0216725 A1 | 9/2011 | Miki et al. | |
| 2011/0312277 A1 | 12/2011 | Gupta | |

FOREIGN PATENT DOCUMENTS

| | | |
|---|---|---|
| EP | 1072102 A1 | 1/2001 |
| EP | 1594260 A1 | 11/2005 |
| EP | 1808990 A1 | 7/2007 |
| EP | 1850612 A1 | 10/2007 |
| EP | 1676424 B1 | 2/2008 |
| EP | 1887709 A1 | 2/2008 |
| JP | 2008061250 A | 3/2008 |
| JP | 2009514441 | 4/2009 |
| RU | 2122288 C1 | 11/1998 |
| RU | 2198466 C2 | 2/2003 |
| RU | 2293442 C1 | 2/2007 |
| WO | WO9427384 A1 | 11/1994 |
| WO | 9844644 A1 | 10/1998 |
| WO | WO0048327 | 8/2000 |
| WO | 2004064295 A2 | 7/2004 |
| WO | 2007051140 A2 | 5/2007 |
| WO | WO2009114640 | 9/2009 |

OTHER PUBLICATIONS

Taiwan Search Report—TW098113224—TIPO—Jan. 10, 2013.

* cited by examiner

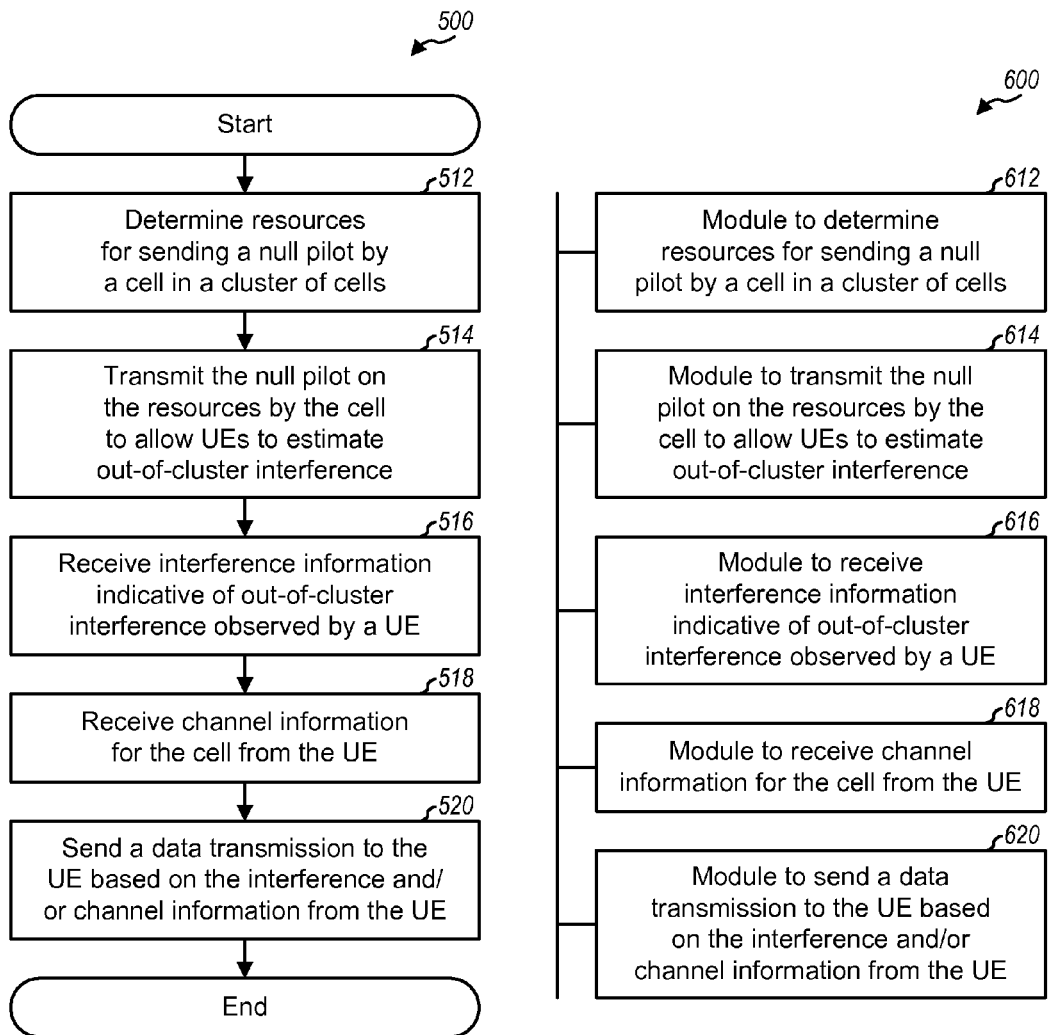

NULL PILOTS FOR INTERFERENCE ESTIMATION IN A WIRELESS COMMUNICATION NETWORK

The present application claims priority to provisional U.S. application Ser. No. 61/047,063, entitled "INTERACTIONS OF RESOURCE UTILIZATION MESSAGES (RUM) AND OTHER SECTOR INTERFERENCE (OSI) INDICATIONS," filed Apr. 22, 2008, and provisional U.S. Application Ser. No. 61/108,429, entitled "OUT-OF-CLUSTER INTERFERENCE ESTIMATION AND CLUSTER NULL PILOTS," filed Oct. 24, 2008, both assigned to the assignee hereof and incorporated herein by reference.

BACKGROUND

I. Field

The present disclosure relates generally to communication, and more specifically to techniques for estimating interference in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may detect multiple cells in a wireless network, where a "cell" can refer to a base station subsystem or its coverage area, depending on the context in which the term is used. One cell may be selected to serve the UE and may be referred to as a serving cell. Alternatively, in a cooperative multipoint (CoMP) system, a cluster of cells may be selected to serve the UE and may be referred to as a serving cluster. The UE may observe interference from other cells (e.g., cells not in its serving cluster), and the interference may impact data transmission from the serving cell or cluster to the UE. It may be desirable to be able to accurately estimate interference from the other cells in order to improve performance of data transmission from the serving cell or cluster.

SUMMARY

Techniques for transmitting null pilots to support interference estimation in a wireless communication network are described herein. On the downlink, a null pilot is non-transmission on designated time-frequency resources by a cell or a cluster of cells. The cluster of cells may support cooperative transmission to a given UE, as described below. The cells in the cluster may transmit null pilots. The received power of the null pilots from the cells in the cluster may be indicative of interference from other cells. The null pilots may thus allow the UE to estimate out-of-cluster interference comprising interference from cells not in the cluster. The out-of-cluster interference may be used to support data transmission to the UE from the cluster of cells.

In one design, a cell in a cluster of cells may determine resources for sending a null pilot by the cell. In one design, each cell in the cluster may be assigned different resources for sending null pilot. In another design, all cells in the cluster may use the same resources for sending null pilots, and different clusters may be assigned different resources for sending null pilots. In any case, the cell may transmit the null pilot (i.e., send no transmissions) on the resources to allow UEs to estimate out-of-cluster interference. The cell may receive interference information and channel information from a UE. The interference information may be indicative of the out-of-cluster interference observed by the UE and may be given in various forms, as described above. The cell may send a data transmission to the UE based on the interference and/or channel information. The remaining cells in the cluster may reduce interference to the UE, e.g., by steering their transmissions away from the UE and/or by reducing their transmit power.

In one design, a UE may determine resources used to send null pilots by multiple cells in a cluster of cells. The UE may receive the null pilots from the multiple cells on the resources used to send the null pilots. The UE may estimate out-of-cluster interference observed by the UE based on the null pilots and may determine interference information. The UE may also determine channel information for at least one potential serving cell in the cluster. The UE may send the interference information and the channel information to at least one designated cell in the cluster. The UE may thereafter receive a data transmission sent by at least one serving cell in the cluster based on the interference and/or channel information from the UE.

Various aspects and features of the disclosure are described in further detail below.

BRIEF DESCRIPTION OF THE DRAWINGS

FIG. 5 shows a process for sending a null pilot by a cell.
FIG. 6 shows an apparatus for sending a null pilot.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
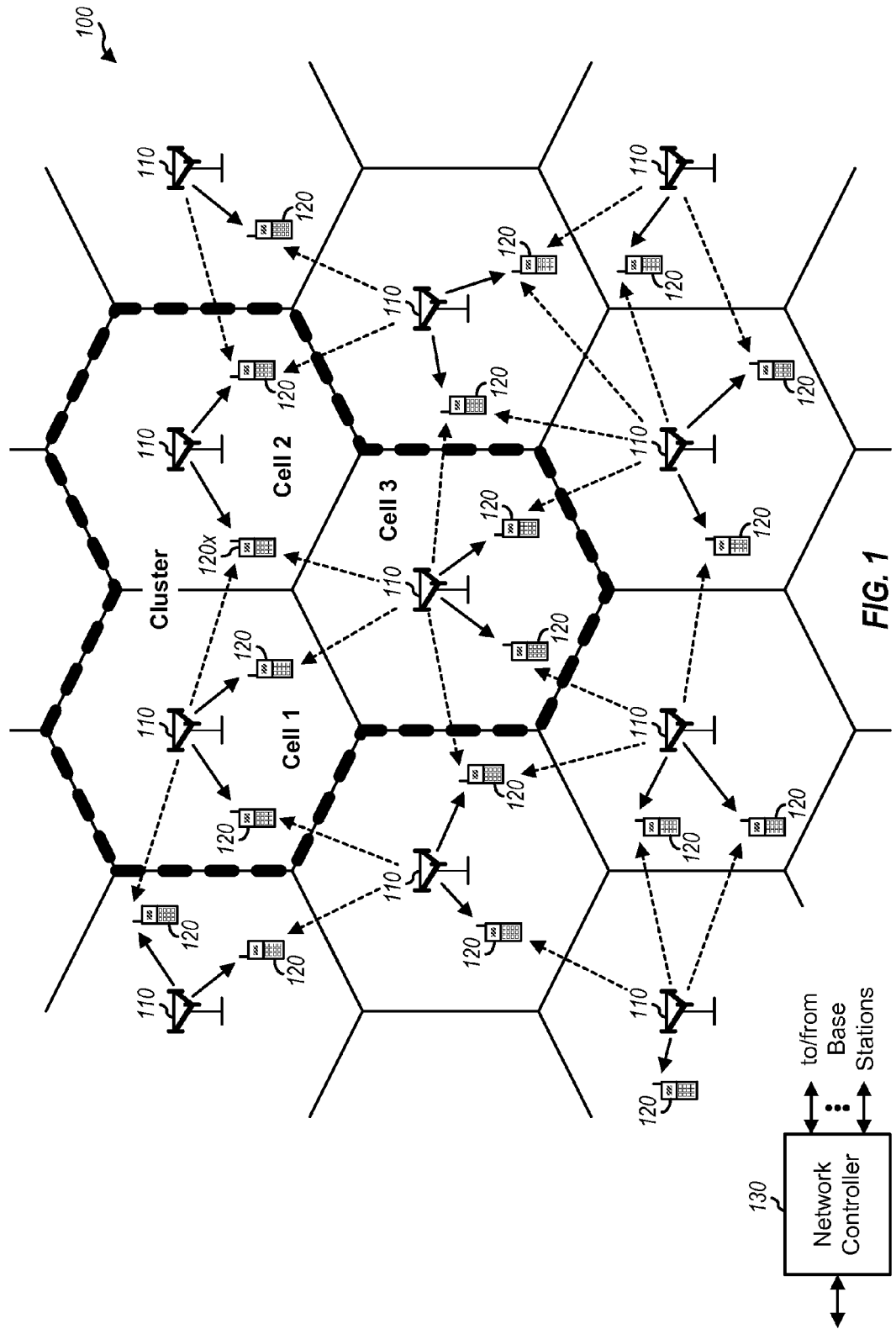
FIG. 1 shows a wireless communication network.

FIG. 1 shows a wireless communication network 100 with multiple base stations 110. A base station may be a station that communicates with the UEs and may also be referred to as a Node B, an evolved Node B (eNB), an access point, etc. Each base station 110 may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description below. A base station may support one or multiple (e.g., three) cells.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs for users in the home). Different types of cells may have different transmit power levels, e.g., 20 Watts for macro cells and 1 Watt for pico and femto cells.

Wireless network 100 may also include relay stations. A relay station is a station that receives a transmission of data and/or other information from an upstream station (e.g., a base station or a UE) and sends a transmission of the data and/or other information to a downstream station (e.g., a UE or a base station). A relay station may also be a UE that relays transmissions for other UEs.

A network controller 130 may couple to a set of base stations and provide coordination and control for these base stations. Network controller 130 may communicate with base stations 110 via a backhaul. Base stations 110 may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. In FIG. 1, a solid line with a single arrow indicates a desired data transmission from a serving cell to a UE, and a dashed line with a single arrow indicates an interfering transmission from a non-serving cell to a UE. A serving cell is a cell designated to serve a UE on the downlink and/or uplink. Uplink transmissions are not shown in FIG. 1 for simplicity.

Wireless network 100 may support cooperative transmission on the downlink in order to improve performance. Cooperative transmission may also be referred to as cooperative multipoint (CoMP), network multiple-input multiple-output (MIMO), distributed MIMO, etc. With cooperative transmission, a set of cells may cooperate with each other to serve one or more UEs. Different forms of cooperative transmission may be supported and may include inter-site packet sharing (ISPS), cooperative beamforming (CB), cooperative silencing (CS), etc. For ISPS, multiple cells (of the same or different base stations) may send a packet to a single UE. Each cell may send a data transmission to the UE based on precoding information determined by the UE for that cell. For CB, a cell may send a data transmission with a precoding matrix selected to steer the data transmission in a direction toward a served UE and away from an interfered UE in a neighbor cell in order to reduce interference to the interfered UE. For CS, a cell may reduce its transmit power (possibly to zero) to reduce interference to an interfered UE.

In general, a cluster is a set of cells. For cooperative transmission, a cluster may include cells that may cooperate with one another to serve one or more UEs. For example, in FIG. 1, a cluster of three cells 1, 2 and 3 may cooperate to serve UE 120x. Other UEs in FIG. 1 may be served by the same cluster or different clusters of cells.

Figure 2:
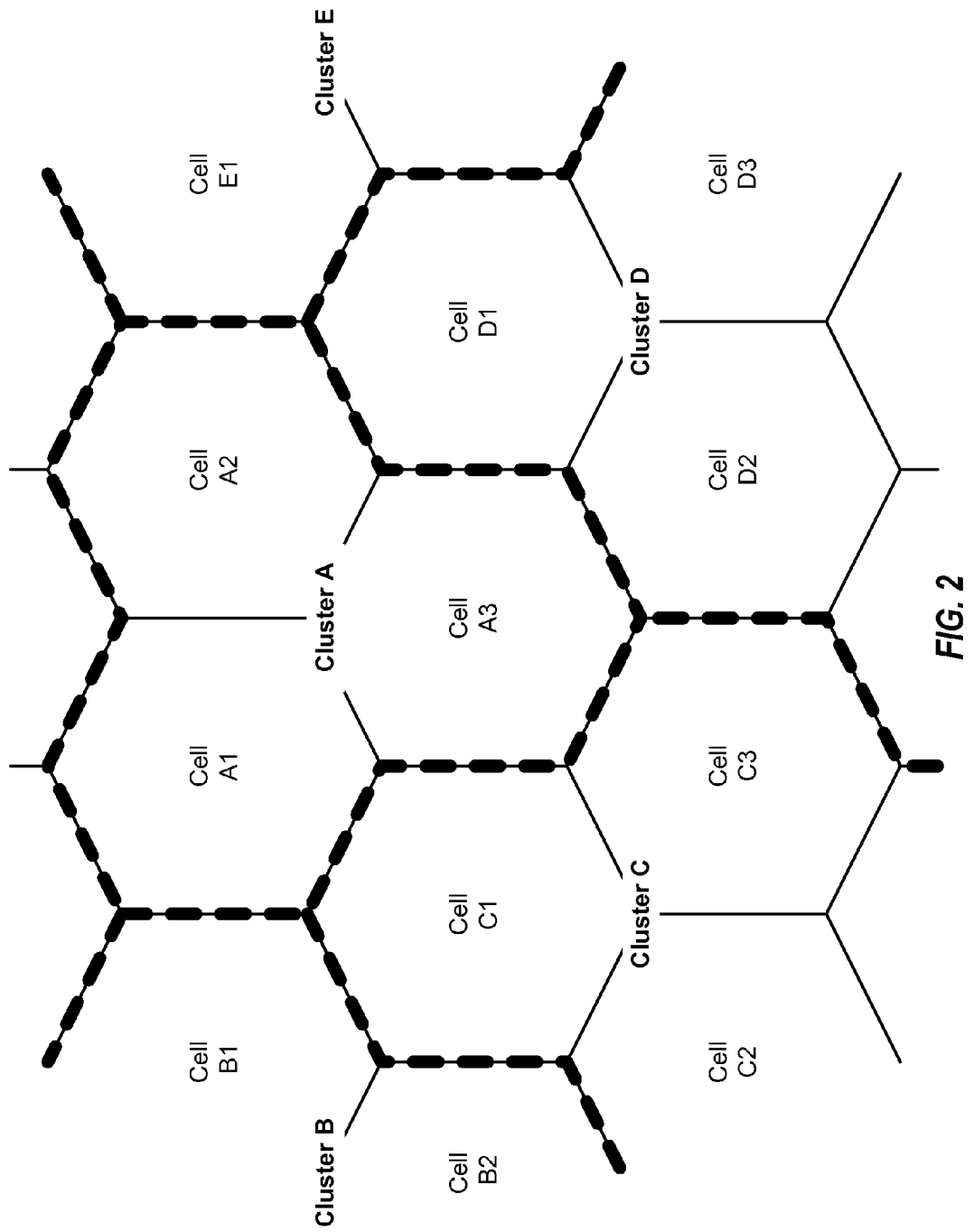
FIG. 2 shows multiple clusters of cells.

FIG. 2 shows an example of multiple clusters of cells. In this example, cluster A includes cells A1, A2 and A3, cluster B includes cells B1, B2, etc., cluster C includes cells C1, C2, C3, etc., cluster D includes cells D1, D2, D3, etc., and cluster E includes cells E1, etc. Each cluster of cells may serve UEs located within the coverage of these cells.

In general, a cluster may include any number of cells. Different clusters may include the same number of cells (not shown in FIG. 2) or different numbers of cells (as shown in FIG. 2). In one design, the clusters may be non-overlapping, and each cell may belong in only one cluster, e.g., as shown in FIG. 2. In another design, the clusters may be overlapping, and a given cell may belong in one or multiple clusters. Clusters may be defined in a static, semi-static, or dynamic manner. In one design, clusters may be statically defined, and each UE may be served by cells in a cluster covering the UE location. In another design, clusters may be dynamically defined. Each UE may be served by a cluster of cells detected by the UE with sufficient received signal strength. Clusters may also be defined in other manners. Different UEs may be associated with different clusters of cells that can serve these UEs.

Various types of information may be used to support cooperative transmission from a cluster of cells to a UE and may include (i) channel information for each potential serving cell in the cluster and (ii) interference information indicative of out-of-cluster interference observed by the UE. The channel information and the interference information may be used to schedule the UE for data transmission, to select a suitable rate for the UE, and to send a data transmission to the UE. A rate may also be referred to as a modulation and coding scheme (MCS), a transport format, a packet format, etc.

In an aspect, null pilots may be used to support estimation of out-of-cluster interference by UEs. Null pilots may be sent by cells on designated time-frequency resources, which may be referred to as null pilot resources. The null pilot resources may be defined in various manners.

Figure 3:
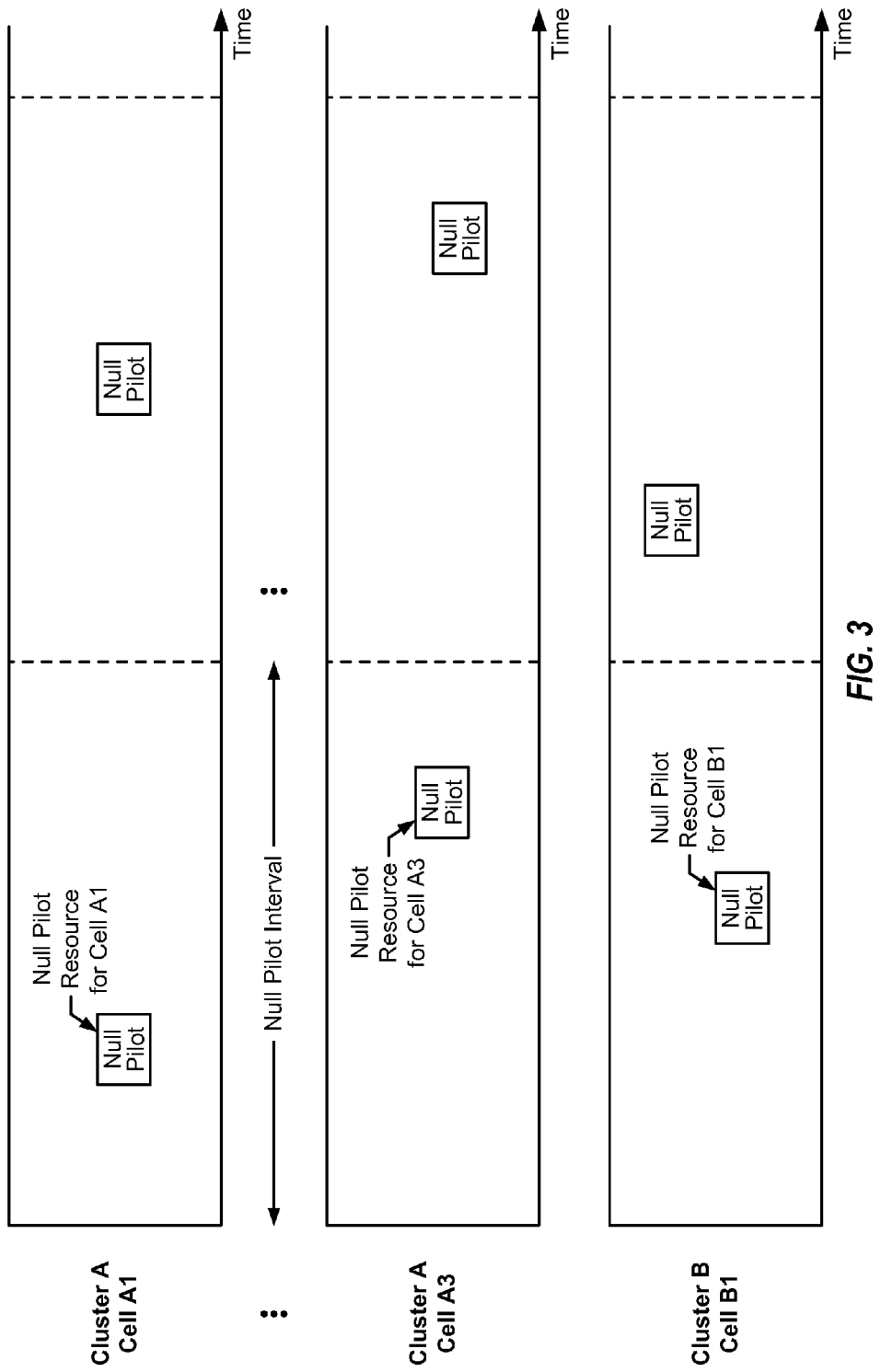
FIG. 3 shows exemplary transmission of cell null pilots.

FIG. 3 shows exemplary transmission of cell null pilots to support out-of-cluster interference estimation. A cell null pilot is non-transmission on time-frequency resources assigned to a cell. In FIG. 3, the horizontal axis for each cell may represent time, and the vertical axis may represent frequency. Each cell may transmit its null pilot on its null pilot resource in each null pilot interval, which may be any suitable time duration. As shown in FIG. 3, different cells may be assigned different time-frequency resources for their null pilots and may thus be associated with different null pilot resources.

The null pilot resources for a given cell may be defined based on one or more cell-specific parameters such as a cell identity (ID). Each cell may be assigned null pilot resources that (i) may be non-overlapping with null pilot resources of neighbor cells or (ii) may overlap null pilot resources of neighbor cells as little as possible. In one design, the null pilot resources for a given cell may be selected based on a hopping function that may select different time-frequency resources across frequency to achieve frequency diversity and to randomize collision with null pilot resources of neighbor cells. In another design, each cell may be assigned static time-frequency resources for its null pilot. The null pilot resources for each cell may also be defined in other manners.

Figure 4:
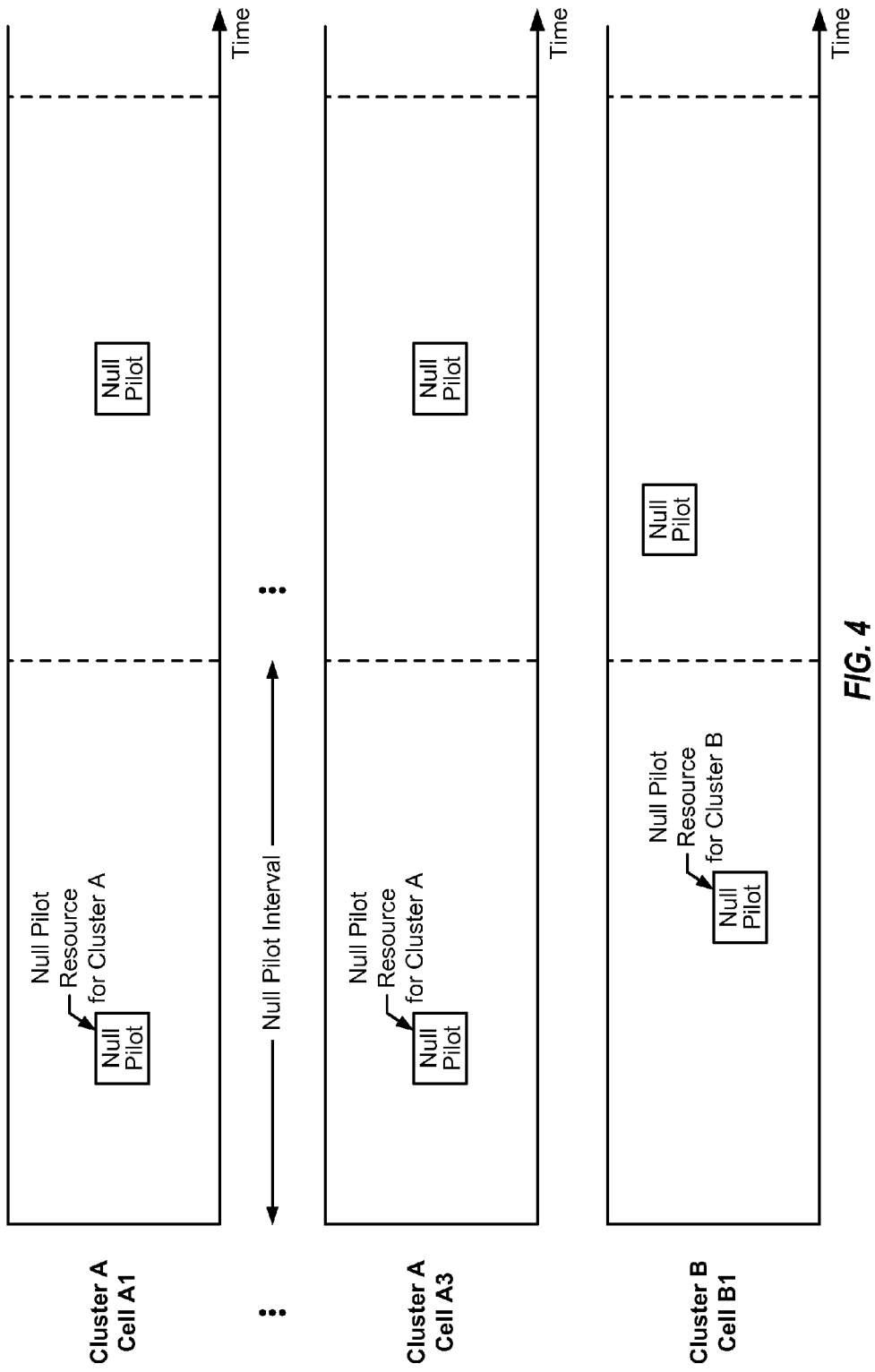
FIG. 4 shows exemplary transmission of cluster null pilots.

A cell may send a null pilot on its null pilot resources in various manners. In a first design, the cell may simply transmit nothing on its null pilot resources, which may be reserved for null pilot and not assigned to other transmissions. In a second design, the cell may puncture (or delete) any data, control, and/or pilot transmission mapped to the null pilot resources. Pilot is a known transmission and may also be referred to as a reference signal, training, etc. In a third design, the cell may wrap data, control, and/or pilot transmission around the null pilot resources. In this design, the cell may save data, control, and/or pilot symbols mapped to the null pilot resources and may remap these symbols on next available resources for the data, control, and/or pilot transmission. For the second and third designs, null pilot resources are not specifically reserved for null pilot and may simply replace resources used for data, control and/or pilot. The blanking of transmission on null pilot resources may also be achieved in other manners. Other cells do not blank the null pilot resources of this cell and may send their transmissions on these resources FIG. 4 shows exemplary transmission of cluster null pilots to support out-of-cluster interference estimation. A cluster null pilot is non-transmission on time-frequency resources assigned to a cluster of cells. All cells in the cluster may use the same time-frequency resources for their null pilots and may then have the same null pilot resources. Different clusters may be assigned different time-frequency resources for their null pilots and may then be associated with different null pilot resources.

The null pilot resources for a given cluster may be defined based on one or more cluster-specific parameters such as a cluster ID. Each cluster may be assigned null pilot resources that (i) may be non-overlapping with null pilot resources of neighbor clusters or (ii) may overlap null pilot resources of neighbor clusters as little as possible. In one design, the null pilot resources for a given cluster may be selected based on a hopping function that may select different time-frequency resources across frequency. In another design, each cluster may be assigned static time-frequency resources for the null pilots. The null pilot resources for each cluster may also be defined in other manners.

Each cell in a cluster may send a null pilot on the null pilot resources for the cluster in various manners. In a first design, each cell may simply transmit nothing on the null pilot resources. In a second design, each cell may puncture any data, control, and/or pilot transmission mapped to the null pilot resources. In a third design, each cell may wrap its data, control, and/or pilot transmission around the null pilot resources. The blanking of transmission on null pilot resources may also be achieved in other manners. Cells in other clusters do not blank the null pilot resources of this cluster and may (i) send their transmissions on these resources or (ii) transmit special pilots on these resources. The special pilots may indicate a transmit power level and/or a beam direction of future transmissions by the cells in the other clusters on resources associated with the null pilot resources.

The system bandwidth may be partitioned into subbands, and each subband may cover a range of frequencies, e.g., 1.08 megahertz (MHz) in LTE. The transmission timeline for each of the downlink and uplink may be partitioned into units of subframes. Each subframe may have a predetermined duration, e.g., 1 millisecond (ms), and may include two slots. The available time-frequency resources for each link may be partitioned into resource blocks. Each resource block may cover a particular time and frequency dimension, e.g., 12 subcarriers in one slot for LTE.

Null pilot resources for cell null pilots and cluster null pilots may be defined at different granularities. In one design, a single set of null pilot resources may be defined for all subframes and all subbands. In this design, a cell may transmit a null pilot on specific time-frequency resources in each null pilot subframe, which is a subframe in which the null pilot is sent. In another design, different sets of null pilot resources may be defined for (i) different subframes and/or subbands or (ii) different groups of subframes and/or subbands. For example, a cell may transmit multiple null pilots on different blocks of time-frequency resources in different subbands of a given null pilot subframe. This design may enable UEs to obtain separate out-of-cluster interference estimates for different subframes and/or subbands and determine received signal quality for specific resources. This design may also enable more efficient resource partitioning between different clusters of cells. For both designs, the null pilot resources may vary across frequency (e.g., subbands) and/or across time (e.g., subframes) to achieve diversity. The null pilot resources may also hop across frequency to achieve frequency diversity and to randomize collision of null pilot resources for different cells or clusters.

A given UE may estimate out-of-cluster interference based on cell null pilots in various manners. The UE may be associated with a cluster of K cells that may cooperate to serve the UE, where K may be any value greater than one. Each cell in the cluster may transmit a cell null pilot on its null pilot resources. The K cells in the cluster may transmit their cell null pilots on different null pilot resources, e.g., as shown in FIG. 3.

In a first design, the UE may measure the received power $I_k$ of the cell null pilot from each cell in the cluster, which may be expressed as:

$$I_k = P_{RX,total} - P_{RX,k}, \text{ for } k=1,\ldots,K, \qquad \text{Eq}(1)$$

where $P_{RX,k}$ is the received power of cell k at the UE, $P_{RX,total}$ is the total received power at the UE, and $I_k$ is the received power of all cells, except for cell k, at the UE.

$I_k$ may also be referred to as the total interference to cell k at the UE.

The cell null pilot from each cell may thus be used to estimate the total interference $I_k$ from all other cells including the cells in the cluster. The UE may obtain K received powers for the cell null pilots from the K cells in the cluster. The UE may also measure the total received power at the UE based on any suitable transmission on any resources. The UE may then estimate the out-of-cluster interference, as follows:

$$I_{OOC} = \sum_{k=1}^{K} I_k - (K-1) \cdot P_{RX,total} = P_{RX,total} - \sum_{k=1}^{K} P_{RX,k}, \quad \text{Eq (2)}$$

where $I_{OOC}$ is the out-of-cluster interference observed by the UE.

As shown in equation (2), the out-of-cluster interference may include all received power at the UE, except for the received powers of the cells in the cluster. The UE may obtain out-of-cluster interference estimates for different null pilot resources and may filter/average these estimates across time and/or frequency to obtain a more accurate out-of-cluster interference estimate.

The UE may also obtain upper bounds on the out-of-cluster interference, as follows:

$$I_{OOC} \le \min_{1 \le k \le K} I_k \le \frac{1}{K} \cdot \sum_{k=1}^{K} I_k. \quad \text{Eq (3)}$$

As shown in equation (3), the out-of-cluster interference may be limited by the minimum or the average of the received powers of the cell null pilots from the cells in the cluster. In equation (3), the total interference $I_k$ for each cell may be replaced by its filtered/averaged version, as described above.

For the example shown in FIG. 1, UE 120x may be associated with a cluster of three cells 1, 2 and 3. UE 120x may measure the received power of the cell null pilot from each cell in the cluster and may obtain the following:

$I_1 = P_{RX,total} - P_{RX,1}$, $I_2 = P_{RX,total} - P_{RX,2}$, and $I_3 = P_{RX,total} - P_{RX,3}$.  Eq(4)

UE 120x may also measure the total received power $P_{RX,total}$ at the UE. UE 120x may then estimate the out-of-cluster interference, as follows:

$I_{OOC} = I_1 + I_2 + I_3 - 2 \cdot P_{RX,total} = P_{RX,total} - P_{RX,1} - P_{RX,2} - P_{RX,3}$.  Eq(5)

In a second design, the UE may measure the received power $I_k$ of the cell null pilot from a particular cell k in the cluster, as shown in equation (1). The UE may also measure the received power $P_{RX,k}$ of each of the remaining cells in the cluster, e.g., based on a pilot transmission from the cell. The UE may then obtain an out-of-cluster interference estimate for cell k, as follows:

$$I_{OOC,k} = I_k - \sum_{i=1, i \ne k}^{K} P_{RX,i}, \quad \text{Eq (6)}$$

where $I_{OOC,k}$ is an out-of-cluster interference estimate for cell k based on the cell null pilot from cell k.

The UE may measure the received powers of the cell null pilots from one or more cells in the cluster and may obtain an out-of-cluster interference estimate for each measured cell. The UE may retain out-of-cluster interference estimates for measured cells with sufficiently high received power and may discard remaining out-of-cluster interference estimates. The UE may then filter/average out-of-cluster interference estimates for some or all cells in the cluster to obtain a more accurate estimate of the out-of cluster interference, as follows:

$I_{OOC} = \text{Filter}\{I_{OOC,1}, \ldots, I_{OOC,K}\}$.  Eq(7)

where Filter { } may be any suitable filtering/averaging function. The UE may also filter out-of-cluster interference estimates for different null pilot resources across time and/or frequency to obtain a more accurate out-of-cluster interference estimate.

For the example shown in FIG. 1, UE 120x may measure the received power of the cell null pilot from each cell in the cluster and may obtain the measurements shown in equation set (4). UE 120x may also measure the received power of each cell in the cluster and obtain $P_{RX,1}$, $P_{RX,2}$ and $P_{RX,3}$. UE 120x may then obtain an out-of-cluster interference estimate for each cell in the cluster, as follows:

$I_{OOC,1} = P_{RX,total} - P_{RX,2} - P_{RX,3}$, $I_{OOC,2} = P_{RX,total} - P_{RX,1} - P_{RX,3}$, and $I_{OOC,3} = P_{RX,total} - P_{RX,1} - P_{RX,2}$.  Eq(8)

UE 120x may average the out-of-cluster interference estimates for the three cells in the cluster, as follows:

$I_{OOC} = (I_{OOC,1} + I_{OOC,2} + I_{OOC,3})/3$.  Eq(9)

UE 120x may also filter the out-of-cluster interference estimates in other manners.

The UE may also estimate the out-of-cluster interference based on the cell null pilots in other manners. The UE may select a particular design or scheme for estimating out-of-cluster interference based on various factors such as the transmissions available for making measurements, the reliability of the measurements for the available transmissions, etc. For example, the UE may use the first design described above if the received power $I_k$ of the null pilots from the cells in the cluster can be reliably measured. This may be the case if the cells in the cluster are received with comparable signal strength at the UE. The UE may use the second design described above if the interference power $I_k$ of the null pilot from one particular cell as well as the received power $P_k$ of the remaining cells in the cluster can be reliably measured. This may by the case if the UE receives a substantially stronger signal from one cell, as compared to the other cells in the cluster.

In one design, the UE may estimate the received power of a cell in the cluster based on the received power of the cell null pilot from that cell, as follows:

$P_{RX,k} = P_{RX,total} - I_k$,  Eq(10)

where $P_{RX,total}$ may be measured by the UE based on any suitable transmission on any resources, and $I_k$ may be measured by the UE based on the cell null pilot from cell k. In another design, the received power of a cell in the cluster may be estimated based on a reference signal or pilot transmitted by the cell on known time-frequency resources.

A given UE may estimate out-of-cluster interference based on cluster null pilots in various manners. The UE may be associated with a cluster of cells that may cooperate to serve the UE. Each cell in the cluster may transmit a cluster null pilot on the null pilot resources for the cluster, e.g., as shown in FIG. 4. The UE may measure the received power $P_{RX,null}$ of the cluster null pilots from the cells in the cluster. The UE may use this received power as an estimate of the out-of-cluster interference, as follows:

$I_{OOC} = P_{RX,null}$.  Eq(11)

The UE may obtain out-of-cluster interference estimates for different null pilot resources for the cluster and may filter/average these estimates to obtain a more accurate estimate of the out-of-cluster interference. The UE may also estimate the out-of-cluster interference based on the cluster null pilots in other manners.

A UE may be equipped with multiple (R) receive antennas and may receive a data transmission from a serving cell in a cluster. The received symbols from the multiple receive antennas at the UE may be expressed as:

$$r = H P s + n = H_{\textit{eff}} s + n, \quad \text{Eq(12)}$$

where s is a vector of data symbols sent by the serving cell to the UE,

P is a precoding matrix used by the serving cell,

H is a channel matrix for the downlink channel from the serving cell to the UE, $H_{\textit{eff}} = H P$ is an effective channel matrix, r is a vector of received symbols at the UE, and n is a vector of noise and interference at the UE.

The cells in the cluster may cooperate for the data transmission to the UE. The serving cell may select the precoding matrix P to steer the data transmission toward the UE and away from other UEs that might be served by other cells in the cluster. The other cells in the cluster may steer their data transmissions away from the UE. Vector n may then include mostly out-of-cluster interference observed by the UE.

For the cluster null pilots, e.g., shown in FIG. 4, the UE may estimate the interference vector n based on received symbols for the null pilots from the cells in the cluster. The UE may derive an interference covariance matrix $R_{nn}$, as follows:

$$R_{nn} = E\{n\,n^H\}, \quad \text{Eq(13)}$$

where E { } denotes an expectation operation, and

"$^H$" denotes a Hermitian or conjugate transpose.

The UE may obtain different interference vectors n for different null pilot resources. The UE may compute an outer product of each interference vector n and may average the outer products of all interference vectors to obtain the interference covariance matrix $R_{nn}$.

For the cell null pilots, e.g., shown in FIG. 3, the UE may obtain a received vector $r_k$ for the null pilot from each cell k in the cluster. The UE may compute an outer product $r_k\,r_k^H$ for each cell based on its received vector. The UE may then compute $R_{nn}$ based on the outer products $r_k\,r_k^H$ for all cells in the cluster using computation analogous to those shown in equation (2), (3) or (6).

The UE may send the interference covariance matrix $R_{nn}$ to the network, e.g., to the serving cell. In one design, the UE may send all elements of $R_{nn}$ to the network. Since $R_{nn}$ is an R×R matrix, the UE may send 16 elements of $R_{nn}$ for a case in which R=4. In another design, the UE may compress the elements of $R_{nn}$ and may send the compressed elements. In yet another design, the UE may perform eigenvalue decomposition of $R_{nn}$, as follows:

$$R_{nn}^H R_{nn} = E \Lambda E, \quad \text{Eq(14)}$$

where E is a unitary matrix of eigenvector of $R_{nn}$, and $\Lambda$ is a diagonal matrix of eigenvalues of $R_{nn}$.

Unitary matrix E is characterized by the property $E^H E = I$, where I is an identity matrix. The columns of E are orthogonal to one another, and each column has unit power. The T columns of E are referred to as T eigenvectors. The T diagonal elements of $\Lambda$ are eigenvalues that represent the power gains of the eigenmodes of $R_{nn}$ and are associated with the T eigenvectors of E. The UE may report L largest eigenvalues and the corresponding L eigenvectors to the network, where L may be less than R. The UE may also send the interference covariance matrix $R_{nn}$ to the network in other manners. The network may use interference covariance matrices from the UE and other UEs to schedule UEs for data transmission and to select suitable rates for the scheduled UEs.

The UE may perform receiver spatial processing based on a minimum mean square error (MMSE) technique or some other detection techniques to reduce the out-of-cluster interference observed by the UE. The UE may derive a spatial filter matrix M based on the MMSE technique, as follows:

$$M = D[H_{\textit{eff}}^H H_{\textit{eff}} + R_{nn}]^{-1} H_{\textit{eff}}^H, \quad \text{Eq(15)}$$

where $D = \text{diag}\{[H_{\textit{eff}}^H H_{\textit{eff}} + R_{nn}]^{-1} H_{\textit{eff}}^H H_{\textit{eff}}\}^{-1}$.

The UE may perform receiver spatial processing as follows:

$$\hat{s} = M r + \tilde{n}, \quad \text{Eq(16)}$$

where $\hat{s}$ is a vector of detected symbols for the serving cell, and $\tilde{n} = M n$ is a vector of noise and interference after receiver spatial processing.

The UE may send interference information and/or channel information in various manners. In one design, the UE may select a receiver spatial processing scheme (e.g., MMSE) to null out the out-of-cluster interference. The UE may apply this receiver spatial processing scheme on the received symbols from the null pilots and may obtain post-processed interference information, e.g., a post-processed interference vector $\tilde{n} = M n$. The UE may also apply this receiver spatial processing scheme on received pilot symbols from each potential serving cell in the cluster and may obtain post-processed channel information, e.g., a composite channel matrix $\tilde{H} = M H$ for each potential serving cell. The UE may send the post-processed interference and channel information to the network. In another design, the UE may select a receiver spatial processing scheme and may report this receiver spatial processing scheme. The UE may also send raw interference information (e.g., the interference vector n or the interference covariance matrix $R_{nn}$) and raw channel information (e.g., the channel matrix H for each potential serving cell) to the network. In yet another design, the receiver spatial processing scheme may be predefined or communicated separately, e.g., via Layer 3 (L3) messages. The UE may report only the raw interference information and the raw channel information.

In one design, the network may receive the interference and channel information reported by the UE and may use the reported information for various purposes such as scheduling, rate selection, etc., for the UE. The network may evaluate different precoding matrices and select a precoding matrix that can provide good performance. The network may estimate the received signal quality at the UE based on (i) the interference and channel information (e.g., the interference covariance matrix $R_{nn}$ and the channel matrix H) reported by the UE, (ii) the precoding matrix P selected for the serving cell, and (iii) the receiver spatial processing scheme used by the UE. The network may select a rate for the UE based on the estimated received signal quality at the UE. The serving cell may then send a data transmission with the precoding matrix P at the selected rate to the UE.

In another design, the network may receive interference and channel information from various UEs. Each UE may report interference information (e.g., out-of-cluster interference) and channel information (e.g., a channel matrix) for each potential serving cell. The network may use the interference and channel information from the UEs for various purposes such as scheduling, rate selection, interference avoidance or mitigation, interference management, etc. For example, the network may use the interference and channel information to evaluate different possible scheduling scenarios and to select scheduling scenarios that can achieve good performance. Each possible scheduling scenario may correspond to a particular cluster of cells that can cooperate with each other, a particular type of cooperation (e.g., ISPS, CB, CS, etc.), a particular set of UEs to be served by the cluster of cells, a particular set of time-frequency resources, and a particular beam direction and a particular transmit power level for each cell in the cluster on the time-frequency resources. The evaluation of different possible scheduling scenarios may be based on one or more network utility criteria such as overall rate, fairness, quality-of-service (QoS) requirements, etc. The evaluation may be performed based on the interference and channel information reported by the UEs to the network. The reported interference and channel information may thus allow the network to improve performance for cooperative transmission when the clusters of cells and/or the strategy for serving UEs may not be known at the UEs.

The null pilots described herein may be used to estimate out-of-cluster interference, as described above. The null pilots may also be used for other purposes such as estimation of out-of-cell interference comprising interference observed by a cell from other cells.

In one design, null pilots may be used to estimate the amount of controlled or uncontrolled interference on the uplink. A given cell may determine interference indicators indicative of interference observed by the cell and may send the interference indicators to interfering UEs in neighbor cells. Some UEs may honor/obey the interference indicators and may adjust their transmit power according. These UEs may then cause "controlled" interference to the cell. Other UEs may dismiss/ignore the interference indicators, and these UEs may cause "uncontrolled" interference to the cell. The terms "controlled" and "uncontrolled" may thus refer to the ability of the cell to control the interference via the interference indicators. The total interference at the cell may include both controlled interference from UEs honoring the interference indicators and uncontrolled interference from UEs dismissing the interference indicators.

To allow the cell to distinguish between controlled and uncontrolled interference, UEs that honor the interference indicators from the cell may send no transmissions on null pilot resources for the cell. UEs that dismiss the interference indicators may transmit on the null pilot resources in the normal manner. The cell may estimate the uncontrolled interference by measuring the received power of the null pilot resources. The cell may estimate the total interference by measuring the received power of other resources. The cell may determine the controlled interference by subtracting the uncontrolled interference from the total interference.

In another design, null pilots may be used to distinguish between interference from UEs served by cells of different power classes. For example, different null pilot resources may be reserved for cells of different power classes. UEs served by cells of a given power class X (e.g., by macro cells of high-power class) may avoid transmitting on the null pilot resources for power class X. UEs served by cells of other power classes (e.g., pico and femto cells of lower-power class) may transmit on the null pilot resources for power class X. The interference due to UEs served by cells of other power classes may then be determined based on the received power of the null pilot resources for power class X.

FIG. 5 shows a design of a process 500 for sending a null pilot in a wireless network. Process 500 may be performed by a cell (as described below) or some other entity. The cell may belong in a cluster of cells and may determine resources for sending a null pilot by the cell (block 512). In one design, each cell in the cluster may be assigned different resources for sending null pilot, e.g., as shown in FIG. 3. In another design, all cells in the cluster may use the same resources for sending null pilots, and different clusters may be assigned different resources for sending null pilots, e.g., as shown in FIG. 4. The cell may determine the resources for sending the null pilot based on a function of an ID of the cell or the cluster. The function may comprise a hopping function that selects different resources (across frequency and/or time) for sending the null pilot.

The cell may transmit the null pilot on the resources to allow UEs to estimate out-of-cluster interference comprising interference from cells not in the cluster (block 514). The cell may transmit the null pilot by sending no transmissions on the resources. In one design, the cell may puncture symbols mapped to the resources. In another design, the cell may determine symbols mapped to the resources and may remap these symbols to other resources available for these symbols.

The cell may receive interference information indicative of out-of-cluster interference observed by a UE (block 516). The interference information may comprise out-of-cluster interference power $I_{OOC}$ at the UE, a covariance matrix $R_{nn}$ of the out-of-cluster interference, received out-of-cluster interference n prior to receiver spatial processing at the UE, post-processed out-of-cluster interference ñ after receiver spatial processing at the UE, and/or other information. The cell may also receive channel information for the cell, and possibly for other cells in the cluster, from the UE (block 518). A scheduler for the cell may determine whether to schedule the UE for data transmission based on the interference and/or channel information from the UE and other UEs.

The cell may send a data transmission to the UE based on the interference and/or channel information from the UE (block 520). The cell may estimate received signal quality at the UE based on the interference information from the UE and may determine a rate based on the estimated received signal quality. The cell may determine a precoding matrix based on the channel information from the UE. The cell may send the data transmission with the precoding matrix and at the determined rate to the UE. Each remaining cell in the cluster may reduce interference to the UE, e.g., by steering its transmission in a direction away from the UE and/or by reducing its transmit power.

FIG. 6 shows a design of an apparatus 600 for sending a null pilot in a wireless communication network. Apparatus 600 includes a module 612 to determine resources for sending a null pilot by a cell in a cluster of cells, a module 614 to transmit the null pilot on the resources by the cell to allow UEs to estimate out-of-cluster interference, a module 616 to receive interference information indicative of out-of-cluster interference observed by a UE, a module 618 to receive channel information for the cell from the UE, and a module 620 to send a data transmission to the UE based on the interference and/or channel information from the UE.

Figure 7:
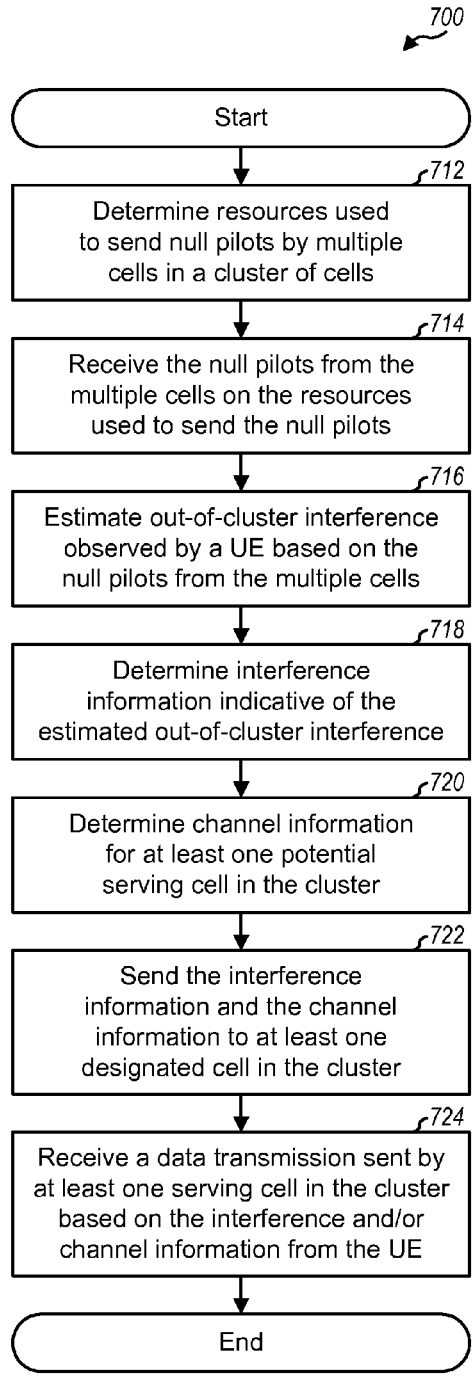
FIG. 7 shows a process for receiving null pilots by a UE.

FIG. 7 shows a design of a process 700 for receiving null pilots in a wireless network. Process 700 may be performed by a UE (as described below) or some other entity. The UE may determine resources used to send null pilots by multiple cells in a cluster of cells (block 712). In one design, each cell in the cluster may be assigned different resources for sending null pilot. In another design, all cells in the cluster may use the same resources for sending null pilots, and different clusters may be assigned different resources for sending null pilots. The UE may determine (i) the resources used by each cell based on a cell ID or (ii) the resources used by all cells in the cluster based on a cluster ID. In any case, the UE may receive the null pilots from the multiple cells on the resources used to send the null pilots (block 714).

The UE may estimate out-of-cluster interference observed by the UE based on the null pilots from the multiple cells (block 716). In one design, the UE may determine the received power $I_k$ of the null pilot from each cell in the cluster and may determine the total received power $P_{RX,total}$ at the UE. The UE may then estimate the out-of-cluster interference $I_{OOC}$ based on the received powers of the null pilots from all cells in the cluster and the total received power at the UE, e.g., as shown in equation (2). In another design, the UE may determine the received power $P_{RX,k}$ of each cell in the cluster and may determine the received power $I_k$ of the null pilot from each of at least one cell in the cluster. The UE may then estimate the out-of-cluster interference $I_{OOC,k}$ and $I_{OOC}$ based on the received power of each cell in the cluster and the received power of the null pilot from each of the at least one cell in the cluster, e.g., as shown in equations (6) and (7). In yet another design, the UE may determine the received power $P_{RX,null}$ of the null pilots from all cells in the cluster and may estimate the out-of-cluster interference based on this received power $P_{RX,null}$, e.g., as shown in equation (11).

In one design, the UE may determine the total received power $P_{RX,total}$ at the UE and may determine the received power $I_k$ of a null pilot from a cell in the cluster. The UE may then determine the received power $P_{RX,k}$ of the cell based on the total received power at the UE and the received power of the null pilot from the cell, e.g., as shown in equation (10). The UE may also use the null pilots for other measurements.

The UE may be equipped with multiple receive antennas. In one design, the UE may determine a covariance matrix $R_{nn}$ of the out-of-cluster interference, e.g., as shown in equation (13). In yet another design, the UE may determine a spatial filter matrix M based on the out-of-cluster interference, e.g., as shown in equation (15). The UE may then apply the spatial filter matrix to the out-of-cluster interference to obtain post-processed out-of-cluster interference ñ, e.g., as shown in equation (16).

The UE may determine interference information indicative of the out-of-cluster interference (block 718). The interference information may comprise the out-of-cluster interference power $I_{OOC}$, the interference covariance matrix $R_{nn}$, the received out-of-cluster interference n, the post-processed out-of-cluster interference ñ, and/or other information. The UE may also determine channel information for at least one potential serving cell in the cluster (block 720). The channel information for each potential serving cell may comprise a channel matrix H, a composite channel matrix Ĥ with receiver spatial processing at the UE, etc. The UE may send the interference information and the channel information to at least one designated cell (e.g., a serving cell) in the cluster (block 722).

The UE may thereafter receive a data transmission sent by at least one serving cell in the cluster based on the interference and/or channel information from the UE (block 724). For example, the data transmission may be sent with a precoding matrix determined based on the channel information and at a rate determined based on the interference information from the UE. For cooperative transmission, each remaining cell in the cluster may reduce interference to the UE.

Figure 8:
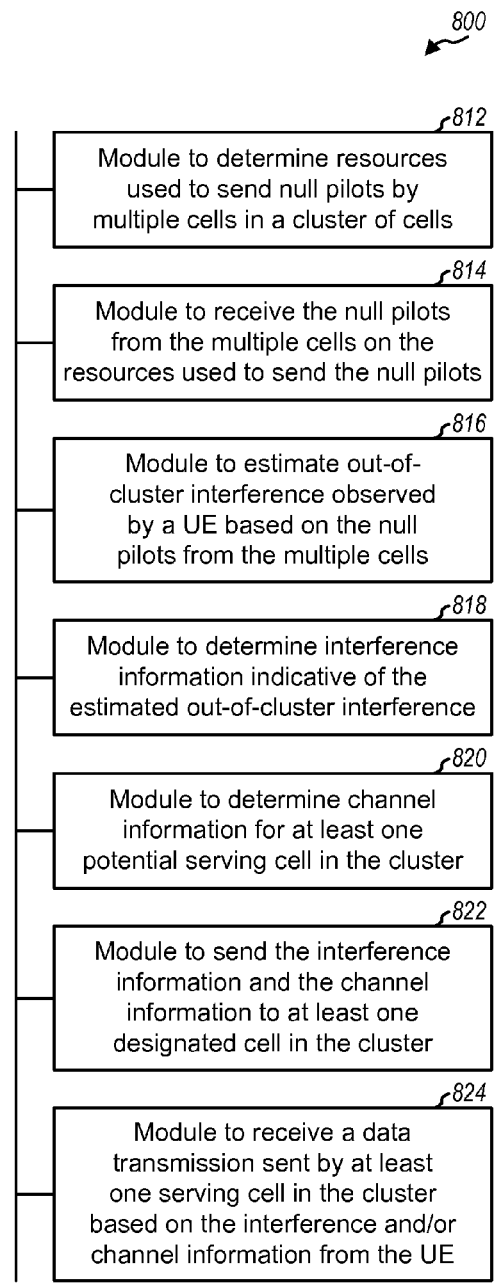
FIG. 8 shows an apparatus for receiving null pilots.

FIG. 8 shows a design of an apparatus 800 for receiving null pilots in a wireless network. Apparatus 800 includes a module 812 to determine resources used to send null pilots by multiple cells in a cluster of cells, a module 814 to receive the null pilots from the multiple cells on the resources used to send the null pilots, a module 816 to estimate out-of-cluster interference observed by a UE based on the null pilots from the multiple cells, a module 818 to determine interference information indicative of the out-of-cluster interference, a module 820 to determine channel information for at least one potential serving cell in the cluster, a module 822 to send the interference information and the channel information to at least one designated cell in the cluster, and a module 824 to receive a data transmission sent by at least one serving cell in the cluster based on the interference and/or channel information from the UE.

Figure 9:
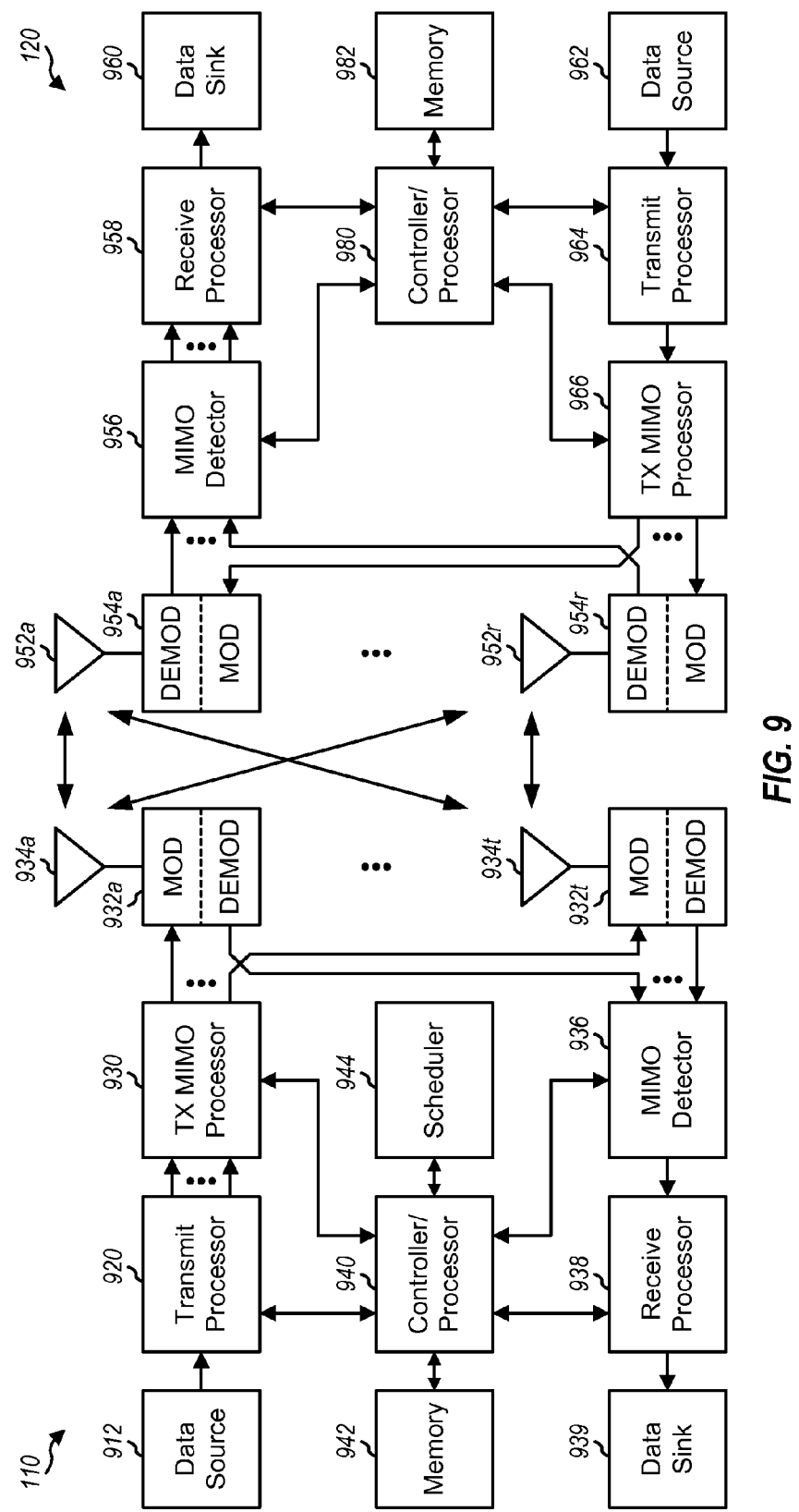
FIG. 9 shows a design of a base station and a UE.

The modules in FIGS. 6 and 8 may comprise processors, electronics devices, hardware devices, electronics components, logical circuits, memories, software codes, firmware codes, etc., or any combination thereof FIG. 9 shows a block diagram of a design of a base station 110 and a UE 120, which may be one of the base stations and one of the UEs in FIG. 1. Base station 110 may support one or more cells. Base station 110 may be equipped with T antennas 934a through 934t, and UE 120 may be equipped with R antennas 952a through 952r, where in general T≥1 and R≥1.

At base station 110, a transmit processor 920 may receive data for one or more UEs from a data source 912, process (e.g., encode, interleave, and symbol map) the data for each UE, and provide data symbols for all UEs. Transmit processor 920 may also process control information from a controller/processor 940 and provide control symbols. Transmit processor 920 may also generate pilot symbols for a pilot or reference signal and may also send no transmissions on resources used for null pilot for each cell supported by base station 110. A transmit (TX) MIMO processor 930 may perform precoding on the data symbols for each UE based on a precoding matrix P selected for the UE. Processor 930 may provide T output symbol streams to T modulators (MODs) 932a through 932t. Each modulator 932 may process a respective output symbol stream (e.g., for OFDM, CDMA, etc.) to obtain an output sample stream. Each modulator 932 may further process (e.g., convert to analog, amplify, filter, and upconvert) the output sample stream to obtain a downlink signal. T downlink signals from modulators 932a through 932t may be transmitted via T antennas 934a through 934t, respectively.

At UE 120, antennas 952a through 952r may receive the downlink signals from base station 110 and may provide received signals to demodulators (DEMODs) 954a through 954r, respectively. Each demodulator 954 may condition (e.g., filter, amplify, downconvert, and digitize) a respective received signal to obtain input samples. Each demodulator 954 may further process the input samples (e.g., for OFDM, CDMA, etc.) to obtain received symbols. A MIMO detector 956 may obtain received symbols from all R demodulators 954a through 954r, perform receiver spatial processing on the received symbols if applicable, e.g., as shown in equation (16), and provide detected symbols. A receive processor 958 may process (e.g., demodulate, deinterleave, and decode) the detected symbols, provide decoded data for UE 120 to a data sink 960, and provide decoded control information to a controller/processor 980.

On the uplink, at UE 120, a transmit processor 964 may receive and process data from a data source 962 and feedback information (e.g., interference information, channel information, etc.) from controller/processor 980. Transmit processor 964 may also generate pilot symbols. The symbols from transmit processor 964 may be precoded by a TX MIMO processor 966 if applicable, further processed by modulators 954a through 954r, and transmitted to base station 110. At base station 110, the uplink signals from UE 120 may be received by antennas 934, processed by demodulators 932, detected by a MIMO detector 936 if applicable, and further processed by a receive processor 938 to obtain decoded data and feedback information transmitted by UE 120.

Controllers/processors 940 and 980 may direct the operation at base station 110 and UE 120, respectively. Processor 940 and/or other processors and modules at base station 110 may perform or direct process 500 in FIG. 5 and/or other processes for the techniques described herein. Processor 980 and/or other processors and modules at UE 120 may perform or direct process 700 in FIG. 7 and/or other processes for the techniques described herein. Memories 942 and 982 may store data and program codes for base station 110 and UE 120, respectively. A scheduler 944 may schedule UEs for data transmission on the downlink and/or uplink and may provide resource grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of supporting interference estimation in a wireless communication network, comprising:
   determining resources for sending a null pilot by a cell in a cluster of cells configured to cooperate with one another to serve one or more user equipments (UEs); and
   transmitting the null pilot on the resources by the cell to allow the one or more UEs to estimate an out-of-cluster interference comprising interference from cells not in the cluster.

2. The method of claim 1, wherein each cell in the cluster is assigned different resources for sending null pilots.

3. The method of claim 1, wherein all cells in the cluster are assigned same resources for sending null pilots, and wherein different clusters are assigned different resources for sending null pilots.

4. The method of claim 1, wherein the determining the resources for sending the null pilot comprises determining the resources for sending the null pilot based on a function of an identity (ID) of the cell or the cluster.

5. The method of claim 1, wherein the transmitting the null pilot comprises sending no transmissions on the resources for sending the null pilot by puncturing symbols mapped to the resources.

6. The method of claim 1, wherein the transmitting the null pilot comprises sending no transmissions on the resources for sending the null pilot by determining symbols mapped to the resources and remapping the symbols to other resources.

7. The method of claim 1, further comprising:
receiving interference information indicative of out-of-cluster interference observed by a UE of the one or more UEs; and
sending a data transmission to the UE based on the interference information.

8. The method of claim 7, further comprising:
estimating received signal quality at the UE based on the interference information from the UE; and
determining a rate based on the estimated received signal quality, and wherein the data transmission is sent at the determined rate to the UE.

9. The method of claim 1, further comprising:
receiving channel information for the cell from a UE of the one or more UEs;
determining a precoding matrix based on the channel information; and
sending a data transmission with the precoding matrix to the UE, wherein each remaining cell in the cluster reduces interference to the UE.

10. The method of claim 1, further comprising:
receiving interference information indicative of out-of-cluster interference observed by a UE of the one or more UEs;
receiving channel information for at least one cell in the cluster from the UE; and
determining whether to schedule the UE for data transmission based on the interference information and the channel information.

11. An apparatus for wireless communication, comprising:
means for determining resources for sending a null pilot by a cell in a cluster of cells configured to cooperate with one another to serve one or more user equipments (UEs); and
means for transmitting the null pilot on the resources by the cell to allow the one or more UEs to estimate out-of-cluster interference comprising interference from cells not in the cluster.

12. The apparatus of claim 11, wherein each cell in the cluster is assigned different resources for sending null pilots.

13. The apparatus of claim 11, wherein all cells in the cluster use same resources for sending null pilots, and wherein different clusters are assigned different resources for sending null pilots.

14. The apparatus of claim 11, further comprising:
means for receiving interference information indicative of out-of-cluster interference observed by a UE of the one or more UEs; and
means for sending a data transmission to the UE based on the interference information.

15. The apparatus of claim 11, further comprising:
means for receiving channel information for the cell from a UE of the one or more UEs;
means for determining a precoding matrix based on the channel information; and
means for sending a data transmission with the precoding matrix to the UE, wherein each remaining cell in the cluster reduces interference to the UE.

16. A method of estimating interference in a wireless communication network, comprising:
receiving null pilots from multiple cells in a cluster of cells configured to cooperate with one another to serve one or more user equipments (UEs); and
estimating out-of-cluster interference observed by a user equipment (UE) of the one or more UEs based on the null pilots from the multiple cells, the out-of-cluster interference comprising interference from cells not in the cluster.

17. The method of claim 16, further comprising:
determining resources used to send the null pilots by the multiple cells in the cluster, wherein each cell in the cluster is assigned different resources for sending null pilots.

18. The method of claim 16, further comprising:
determining resources used to send the null pilots by the multiple cells in the cluster, wherein all cells in the cluster use same resources for sending null pilots, and wherein cells in different clusters use different resources for sending null pilots.

19. The method of claim 17, wherein the estimating the out-of-cluster interference comprises:
determining a received power of a null pilot from each cell in the cluster,
determining a total received power at the UE, and
estimating the out-of-cluster interference based on the received powers of the null pilots from all cells in the cluster and the total received power at the UE.

20. The method of claim 19, wherein the estimating the out-of-cluster interference further comprises:
limiting the out-of-cluster interference based on a minimum or an average of the received powers of the null pilots from the multiple cells in the cluster.

21. The method of claim 17, wherein the estimating the out-of-cluster interference comprises:
determining a received power of each cell in the cluster,
determining a received power of a null pilot from each cell in the cluster, and
estimating the out-of-cluster interference based on the received power of each cell in the cluster and the received power of the null pilot from each cell in the cluster.

22. The method of claim 18, wherein the estimating the out-of-cluster interference comprises:
determining a received power of the null pilots from all cells in the cluster, and
estimating the out-of-cluster interference based on the received power of the null pilots from all cells in the cluster.

23. The method of claim 17, further comprising:
determining a total received power at the UE;
determining a received power of a null pilot from a cell in the cluster; and
determining a received power of the cell based on the total received power at the UE and the received power of the null pilot from the cell.

24. The method of claim 16, wherein the UE is equipped with multiple receive antennas, and wherein the estimating the out-of-cluster interference comprises determining a covariance matrix of the out-of-cluster interference.

25. The method of claim 16, further comprising:
determining a spatial filter matrix based on the out-of-cluster interference; and
applying the spatial filter matrix to the out-of-cluster interference to obtain post-processed out-of-cluster interference.

26. The method of claim 16, further comprising:
determining interference information indicative of the out-of-cluster interference; and
sending the interference information to at least one designated cell in the cluster.

27. The method of claim 26, wherein the interference information comprises at least one of out-of-cluster interference power at the UE, a covariance matrix of the out-of-cluster interference, received out-of-cluster interference prior to receiver spatial processing at the UE, and post-processed out-of-cluster interference after receiver spatial processing at the UE.

28. The method of claim 16, further comprising:
determining channel information for at least one potential serving cell in the cluster; and
sending the channel information to at least one designated cell in the cluster.

29. The method of claim 28, wherein the channel information for each potential serving cell comprises a channel matrix for the cell or a composite channel matrix for the cell with receiver spatial processing at the UE.

30. The method of claim 16, further comprising:
receiving a data transmission from at least one cell in the cluster, wherein each remaining cell in the cluster reduces interference to the UE.

31. An apparatus for wireless communication, comprising:
means for receiving null pilots from multiple cells in a cluster of cells configured to cooperate with one another to serve one or more user equipments (UEs); and
means for estimating out-of-cluster interference observed by a user equipment (UE) of the one or more UEs based on the null pilots from the multiple cells, the out-of-cluster interference comprising interference from cells not in the cluster.

32. The apparatus of claim 31, further comprising:
means for determining resources used to send the null pilots by the multiple cells in the cluster, wherein each cell or each cluster of cells is assigned different resources for sending null pilots.

33. The apparatus of claim 31, wherein the means for estimating the out-of-cluster interference comprises:
means for determining a received power of a null pilot from each cell in the cluster, and
means for estimating the out-of-cluster interference based on the received power of the null pilot from each cell in the cluster.

34. The apparatus of claim 31, wherein the means for estimating the out-of-cluster interference comprises:
means for determining a received power of the null pilots from all cells in the cluster, and
means for estimating the out-of-cluster interference based on the received power of the null pilots from all cells in the cluster.

35. The apparatus of claim 31, further comprising:
means for determining interference information indicative of the out-of-cluster interference;
means for determining channel information for at least one potential serving cell in the cluster;
means for sending the interference information and the channel information to at least one designated cell in the cluster; and
means for receiving a data transmission sent by at least one serving cell in the cluster based on the interference information and the channel information, wherein each remaining cell in the cluster reduces interference to the UE.

36. An apparatus for wireless communication, comprising:
at least one processor configured to receive null pilots from multiple cells in a cluster of cells configured to cooperate with one another to serve one or more user equipments (UEs), and to estimate out-of-cluster interference observed by a user equipment (UE) of the one or more UEs based on the null pilots from the multiple cells, the out-of-cluster interference comprising interference from cells not in the cluster.

37. The apparatus of claim 36, wherein the at least one processor is configured to determine resources used to send the null pilots by the multiple cells in the cluster, and wherein each cell or each cluster of cells is assigned different resources for sending null pilots.

38. The apparatus of claim 36, wherein the at least one processor is configured to determine received power of a null pilot from each cell in the cluster, and to estimate the out-of-cluster interference based on the received power of the null pilot from each cell in the cluster.

39. The apparatus of claim 36, wherein the at least one processor is configured to determine a received power of the null pilots from all cells in the cluster, and to estimate the out-of-cluster interference based on the received power of the null pilots from all cells in the cluster.

40. The apparatus of claim 36, wherein the at least one processor is configured to determine interference information indicative of the out-of-cluster interference, to determine channel information for at least one potential serving cell in the cluster, to send the interference information and the channel information to at least one designated cell in the cluster, and to receive a data transmission sent by at least one serving cell in the cluster based on the interference information and the channel information, and wherein each remaining cell in the cluster reduces interference to the UE.

41. A computer program product, comprising:
a computer-readable medium having stored thereon computer-executable instructions for causing a computer to perform a method of supporting interference estimation in a wireless communication network comprising the steps of:
receiving null pilots from multiple cells in a cluster of cells configured to cooperate with one another to serve one or more user equipments (UEs), and
estimating out-of-cluster interference observed by a user equipment (UE) in the one or more UEs based on the null pilots from the multiple cells, the out-of-cluster interference comprising interference from cells not in the cluster.

42. A method of supporting interference estimation in a wireless communication network, comprising:
determining resources reserved for null pilots for a cell; and
transmitting a null pilot on the reserved resources by a user equipment (UE) to allow the cell to estimate interference from UEs.

43. The method of claim 42, further comprising:
receiving an interference indicator from the cell, and wherein the null pilot is transmitted by the UE honoring the interference indicator to allow the cell to estimate uncontrolled interference from UEs not honoring the interference indicator.

44. The method of claim 42, further comprising:
receiving an interference indicator from the cell, and wherein the null pilot is transmitted by the UE not honoring the interference indicator to allow the cell to estimate controlled interference from UEs honoring the interference indicator.

45. The method of claim 42, wherein the reserved resources are for null pilots for cells of a particular power class, and wherein the null pilot is transmitted by the UE served by the cell of the particular power class to allow the cell to estimate interference due to UEs served by cells of other power classes.

46. A method of estimating interference in a wireless communication network, comprising:
  determining resources reserved for null pilots for a cell;
  receiving null pilots from first user equipments (UEs) at the cell; and
  estimating interference observed by the cell from second UEs based on the null pilots from the first UEs.

47. The method of claim 46, further comprising:
  sending an interference indicator from the cell, and wherein null pilots are transmitted by the first UEs honoring the interference indicator to allow the cell to estimate uncontrolled interference from the second UEs not honoring the interference indicator.

48. The method of claim 46, further comprising:
  sending an interference indicator from the cell, and wherein null pilots are transmitted by the first UEs not honoring the interference indicator to allow the cell to estimate controlled interference from the second UEs honoring the interference indicator.

49. The method of claim 46, wherein the reserved resources are for null pilots for cells of a particular power class, and wherein the null pilots are transmitted by the first UEs served by the cell of the particular power class to allow the cell to estimate interference due to the second UEs served by cells of other power classes.

\* \* \* \* \*